March 8, 1966     T. B. MARTIN     3,238,878
CENTRIFUGAL PUMP WITH MAGNETIC DRIVE
Filed March 9, 1964
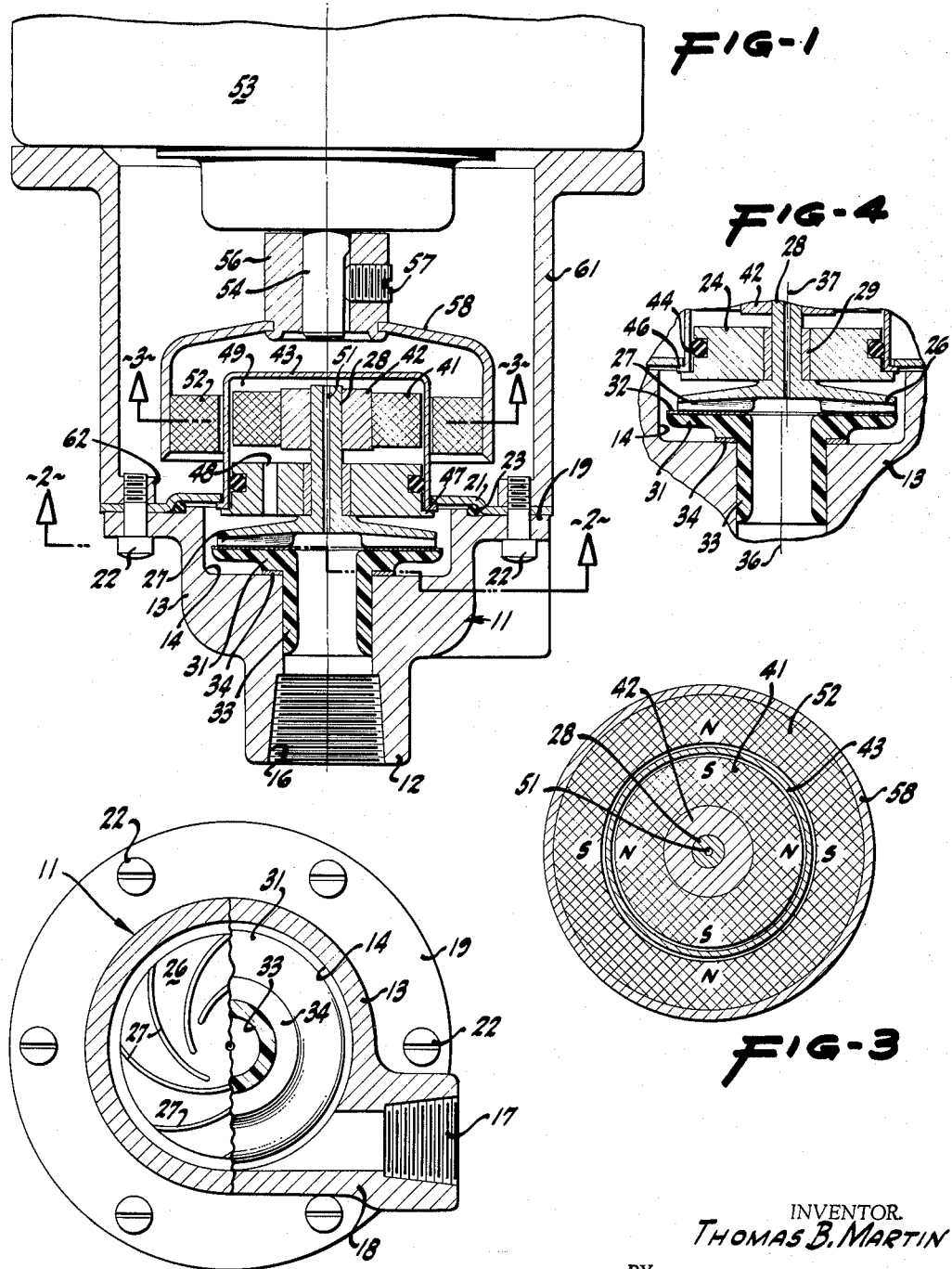
INVENTOR.
THOMAS B. MARTIN
BY
*Julian Caplan*
ATTORNEY United States Patent Office 3,238,878
Patented Mar. 8, 1966

3,238,878
CENTRIFUGAL PUMP WITH MAGNETIC DRIVE
Thomas B. Martin, % Micro-Pump Corp., P.O. Box 392,
Danville, Calif.
Filed Mar. 9, 1964, Ser. No. 350,306
12 Claims. (Cl. 103—87)

This invention relates to a new and improved magnetic drive centrifugal pump, and more particularly to a pump which is driven by a magnetic coupling through a completely sealed partition. A principal feature and advantage of the construction hereinafter described in detail is that there is no shaft seal to leak, wear or become sticky and impose undue load on the driving motor or generate destructive amounts of frictional heat. The drive for the pump is two concentric magnets, one driven by a motor and the other mounted on the pump shaft. Although the gap between the magnets is small, nevertheless, it is sufficient so that a partition may be interposed between the two magnets to serve as a seal and thus eliminate the conventional rotary pump seal interposed between the pump housing and the shaft which extends exteriorly of the pump housing and which frequently is the cause of leakage and other undesirable features.

A principal feature of the construction is the fact that the sealed pump assembly may be removed intact from the motor and replaced with another pump of the same or different design without interference with the driving motor. Conversely, the motor may be replaced without interference with the pump and its associated piping.

Still a further feature of the invention is the fact that the planes of magnetic symmetry of the two magnets mounted on the pump and motor respectively are offset from each other in an axial direction. Such offset produces an axial thrust on the pump shaft which is used as one means of sealing the impeller against the opposite end of the pump.

A still further feature of the invention is the provision of a thrust member in juxtaposition to the impeller serving in effect as a thrust bearing for the impeller and also preventing bypass leakage of the pump.

A still further feature of the invention is the fact that the thrust plate is free to rotate with the impeller or at any lesser speed, depending upon the summation of tangential forces acting upon it, including viscous friction of the fluid being pumped.

Another feature of the design is the fact that the end thrust of the magnet tends to force the impeller into initial contact with the thrust plate. Fluid pressure also acts to press the two together after the pump has commenced operation.

A principal feature of the invention is its simplified construction and ease of manufacture.

Another feature of the invention is the use of bearing materials which do not require special lubrication provisions and which may be run dry for extended periods of time without damage. A still further feature of the invention is the fact that if the bearing surface becomes overheated and seizes, or if for any reason the pump fouls, the torque limit of the magnetic drive will be exceeded before the motor is overloaded. Hence the coupling disengages and the motor runs idle at no load. When the motor rotation is stopped, the coupling automatically re-engages its driving relation. Thus the motor is protected against overload and no heat is generated by the coupling when it is slipping.

Other objects of the present invention will become apparent upon reading the following specification and referring to the accompanying drawings in which similar characters of reference represent corresponding parts in each of the several views.

In the drawings:

FIG. 1 is a longitudinal sectional view of the pump and a portion of the driving motor.

FIGS. 2 and 3 are, respectively, sectional views along lines 2—2 and 3—3 of FIG. 1.

FIG. 4 is a fragmentary sectional view of a portion of FIG. 1 showing the axis of the thrust plate eccentric relative to the impeller.

Pump housing 11 has a hub 12 at one end formed with a central inlet orifice 16 and adjacent hub 12 is a bell-shaped portion 13 which forms pump chamber 14. Inlet port 16 is formed in hub 12 and discharge port 17 in a tangential boss 18 communicating with chamber 14. Outer flange 19 of bell 13 is connected to annular diaphragm 21 by bolts 22 and sealed there by means of O-ring 23. The inner periphery of diaphragm 21 supports cup-like partition 43 in fluid-tight relation. Annular bearing support 24, which together with diaphragm 21 close off one side of pump chamber 14, is frictionally supported in cup 43 by O-ring 44. Flange 47 prevents bearing support 24 from being pushed inwardly beyond desired position during assembly. Mounted in pump chamber 14 is impeller 26 having spiralled curved vanes 27 on the surface facing inlet 16 and on the opposite surface having an elongated shaft 28 which is journalled in bearing 29 received in bearing support 24 and projects exteriorly thereof. Positioned in pump chamber 14 facing impeller vanes 27 is an annular thrust member 31 of a diameter slightly greater than impeller 26 and having its face covered with an anti-friction material 32. One suitable anti-friction material is a commercially available product known as Chemloy, produced by Crane Packing Company, a composition of Teflon, glass-fiber and molybdenum disulfide. The opposite face of thrust plate 31 is formed with a nipple journal member 33 which fits into the entrance of inlet port 16. An anti-friction washer 34 is interposed between the back of thrust plate 31 and housing 11. Thrust plate 31 is centered in housing 11 by means of the journal section 33 with a loose fit. Preferably, the axis 36 of journal 33 is parallel but offset slightly from the axis 37 of impeller 26 (see FIG. 4). The small eccentricity between axes 36, 37 is beneficial in breaking down static friction forces which would otherwise cause impeller 26 and thrust plate 31 to rotate together. Viscous friction with the fluid in the pump is minimized when the thrust plate rotates at a speed less than that of the impeller. Thus the thrust plate turns at its optimum speed, whatever that may be.

An annular ceramic magnet 41, preferably having two north poles and two south poles, is mounted on the exterior end of shaft 28 by means of spacer 42. Surrounding the exterior of magnet 41 is non-magnetic, cup-like partition 43, preferably a poor conductor of electricity. Austenitic stainless steel is satisfactory in most applications, although a conductive material such as brass may be used when speed is not excessive. Thus shaft 28 and magnet 41 are sealed by means of partition 43 without use of rotary seals common in other centrifugal pumps and the disadvantages of rotary seals are eliminated.

The fluid being pumped may be circulated throughout partition 43 and around magnet 41. For such purpose, a hole 48 may be formed in bearing support 24 between pump chamber 14 and the cavity 49 in which magnet 41 rotates and a return passage 51 may be formed in the center of shaft 28.

Magnet 41, as well as drive magnet 52, is a barium carbonate material having incorporated therein a considerable mass of magnetic material such as iron oxide. Such magnets are produced, among others, by Stackpole Carbon Company under the trademark "Cera Magnet."

It is characteristic of such magnet that a plurality of poles may be substantially permanently magnetically induced therein. The magnets have extreme resistance to demagnetization and high electrical resistivity. Eddy current losses are negligible. The number of poles per magnet is subject to wide variation, but in the form shown in FIG. 3, there are two north and two south poles in each of the magnets. The magnets are concentric about the axis of rotation of shaft 28. In the form of the invention here shown the inner magnet 41 is displaced upward in FIG. 1, and since magnets 41, 52 are approximately the same in length, they may be considered to be axially offset. In the accompanying claims, the term "plane of magnetic symmetry" means a plane perpendicular to the axis of rotation of the magnet which is midway of such axis in a magnetic sense. It will be noted that the plane of symmetry of magnet 41 is above that of magnet 52. This produces an end thrust on shaft 28 which tends to force impeller 26 against thrust plate 31 at the inception of rotation of the pump. As the pressure in the pump chamber 14 builds up, the shape of chamber 14 and the shape of impeller 26 and thrust plate 31 tend to augment this characteristic.

The driving motor 53, especially in small sizes, may be a shaded pole induction motor having the axis of shaft 54 in line with the axis of pump shaft 28. Hub 56 is fixed to shaft 54 by setscrew 57 and is stacked to bell-shaped hub 58 which fits around the outer periphery of magnet 52.

An adapter housing 61 is secured to the outer end of motor 53 by means not here illustrated. Adapter 61 may be of a die cast material and different shapes of adapters may be provided to be substituted with different shapes and sizes of standard motors, thus making the pump interchangeable for such motors. The outer flange 62 of adapter 61 is connected to housing flange 19 as well as diaphragm 21 by means of bolts 22.

In operation, fluid enters through inlet port 16 and through the nipple 33 and thrust plate 31 to pump chamber 14. The impeller 26 is caused to rotate with motor 53 by reason of the magnetic drive between the two concentric magnets 41, 52. Fluid leaves the periphery of the impeller under pressure, is collected in chamber 14 and discharged through port 17. If there is any tendency of impeller 26 to stick or jam, the two magnets may slip relative to each other without any generation of heat. By reason of the offset of the planes of magnetic symmetry of the two magnets 41, 52 the impeller 26 is forced against thrust plate 31, thereby sealing the same against undue leakage. The friction material 32 with which plate 31 is faced prevents undue wear. As the pressure builds up, other forces tend to hold impeller 26 against thrust plate 31. By reason of the offset of the axes of rotation 37, 36 of impeller 26 and thrust plate 31 the two slip relative to each other and thrust plate 31 turns at an optimum speed relative to the impeller 26. Meanwhile fluid can circulate through opening 48 into cavity 49 inside partition 43 and flush magnet 41, returning back through hole 51 in shaft 28.

When it is necessary to replace either the pump or the motor the two may be substituted without disturbing the other member. The pump is permanently sealed both from fluid circulation and thermal standpoint from motor 53.

Although the foregoing invention has been described in some detail, by way of illustration and example for purposes of clarity of understanding, it is understood that certain changes and modifications may be practiced within the spirit of the invention and scope of the appended claims.

What is claimed is:

1. A centrifugal pump comprising a casing formed with a pump chamber, a shaft, means rotatably mounting said shaft in said casing, impeller vanes in said chamber on said shaft, a thrust plate in said casing facing and sealing against said impeller vanes, an annular first magnet on said shaft, an annular second magnet surrounding and in proximity to said first magnet, means for rotating said second magnet to turn said first magnet and said impeller, and thrust means to provide an axial force to bias said impeller axially against said thrust plate, said thrust means operable in any position of said pump relative to the force of gravity.

2. A pump according to claim 1 in which said thrust plate is annular and formed with an aperture in said thrust plate, said aperture comprising the inlet port of said pump.

3. A pump according to claim 2 in which the axis of said thrust plate is slightly offset relative to the axis of said impeller.

4. A pump according to claim 3 in which said thrust plate is faced with anti-friction material comprising a reinforced plastic and molybdenum disulphide.

5. A pump according to claim 1 in which each said magnet has a plane of magnetic symmetry, said planes offset in an axial direction to comprise said thrust means.

6. A pump according to claim 1 which further comprises a non-magnetic cup partition sealed relative to said casing and interposed between said magnets in an annular zone.

7. A pump according to claim 6 in which said casing is formed with a pair of flow passageways between said chamber and the interior of said partition one of said passageways formed in said shaft, whereby material pumped circulates through said passageways and throughout the interior of said partition and flushes said magnet.

8. A centrifugal pump comprising a casing formed with a pump chamber in one end and an inlet port in the opposite end, and a discharge port, a thrust member having an annular face in said pump chamber and a nipple-shaped journal extending partially into said inlet port, said thrust member rotatable relative to said casing, a bearing support, a flange fixed to said casing and to said bearing support to form a closure for said pump chamber, an impeller in said pump chamber facing said annular face of said thrust member, a shaft for said impeller rotatable in said bearing support, a first annular magnet on said shaft, a second annular magnet surrounding said first magnet, said magnets having their planes of magnetic symmetry axially offset whereby said impeller is biased against said thrust member, means for rotating said second magnet, a cup-shaped non-magnetic partition enclosing said first magnet and interposed between said magnets, said partition sealed to said bearing support.

9. A pump according to claim 8 in which said bearing support is formed with a first passageway extending between said pump chamber and the interior of a partition and said shaft is formed with a second passageway between said pump chamber and the interior of said partition.

10. A pump according to claim 8 in which said means for rotating said second magnet comprises a motor having a motor shaft, and a steel cup member fixed for rotation with said motor shaft and supporting and surrounding the outside of said second magnet.

11. A pump according to claim 10 which further comprises an adapter interconnecting said motor and said pump housing.

12. A pump according to claim 8 in which said journal has its axis offset relative to the axis of said impeller.

References Cited by the Examiner
UNITED STATES PATENTS 2,970,548   2/1961   Berner _____ 103—87

ROBERT M. WALKER, *Primary Examiner.*